(12) United States Patent
Kobayashi et al.

(10) Patent No.: US 7,536,866 B2
(45) Date of Patent: May 26, 2009

(54) MAGNETIC REFRIGERATOR

(75) Inventors: Tadahiko Kobayashi, Yokohama (JP); Akiko Saito, Kawasaki (JP); Hideyuki Tsuji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 11/385,726

(22) Filed: Mar. 22, 2006

(65) Prior Publication Data

US 2006/0218936 A1    Oct. 5, 2006

(30) Foreign Application Priority Data

Mar. 31, 2005  (JP) ............... 2005-100309

(51) Int. Cl.
  *F25B 21/00*    (2006.01)
(52) U.S. Cl. ....................... 62/3.1
(58) Field of Classification Search .......... 62/3.1
  See application file for complete search history.

(56) References Cited

U.S. PATENT DOCUMENTS

| | | | |
|---|---|---|---|
| 4,332,135 A | | 6/1982 | Barclay et al. |
| 4,408,463 A | * | 10/1983 | Barclay ............... 62/3.1 |
| 4,507,927 A | * | 4/1985 | Barclay ............... 62/467 |
| 4,727,721 A | * | 3/1988 | Peschka et al. ........ 62/3.1 |
| 4,727,722 A | * | 3/1988 | Kirol ................. 62/3.1 |
| 6,526,759 B2 | | 3/2003 | Zimm et al. |
| 6,668,560 B2 | | 12/2003 | Zimm et al. |
| 6,676,772 B2 | | 1/2004 | Saito et al. |
| 6,739,137 B2 | * | 5/2004 | Minovitch ............ 62/3.1 |
| 2002/0053209 A1 | * | 5/2002 | Zimm et al. ........... 62/3.1 |
| 2003/0106323 A1 | * | 6/2003 | Zimm et al. ........... 62/3.1 |
| 2004/0231338 A1 | | 11/2004 | Saito et al. |

OTHER PUBLICATIONS

U.S. Appl. No. 11/365,683, filed Mar. 2, 2006, Hideyuki Tsuji, et al.
U.S. Appl. No. 10/403,119, filed Apr. 1, 2003, Kazuaki Fukamichi, et al.
U.S. Appl. No. 11/675,839, filed Feb. 16, 2007, Kobayashi, et al.
U.S. Appl. No. 11/689,100, filed Mar. 21, 2007, Koga, et al.
U.S. Appl. No. 11/414,302, filed May 1, 2006, Tsuji, et al.
U.S. Appl. No. 11/533,063, filed Sep. 19, 2006, Iwasaki, et al.
U.S. Appl. No. 11/533,163, filed Sep. 19, 2006, Iwasaki, et al.

* cited by examiner

*Primary Examiner*—William C Doerrler
(74) *Attorney, Agent, or Firm*—Oblon, Spivak, McClelland, Maier & Neustadt, P.C.

(57) ABSTRACT

A magnetic refrigerator has a housing, heat exchangers filled with magnetic particles having a magnetocaloric effect, a rotary drive, a rotating shaft, a magnetic field generator fixed to the rotating shaft which applies a magnetic field to or eliminates a magnetic field from the magnetic particles in the heat exchangers following rotation of the rotating shaft, a refrigerant pump which circulates the refrigerant following rotation of the rotating shaft, a rotary refrigerant control valve which controls supply of the refrigerant to and discharge of the refrigerant from the heat exchangers following rotation of the rotating shaft, and a refrigerant circuit. The magnetic field generator and the rotary refrigerant control valve are configured to synchronize application of the magnetic field to or elimination of the magnetic field from the magnetic particles with supply of the refrigerant to or discharge of the refrigerant from the heat exchangers.

12 Claims, 4 Drawing Sheets

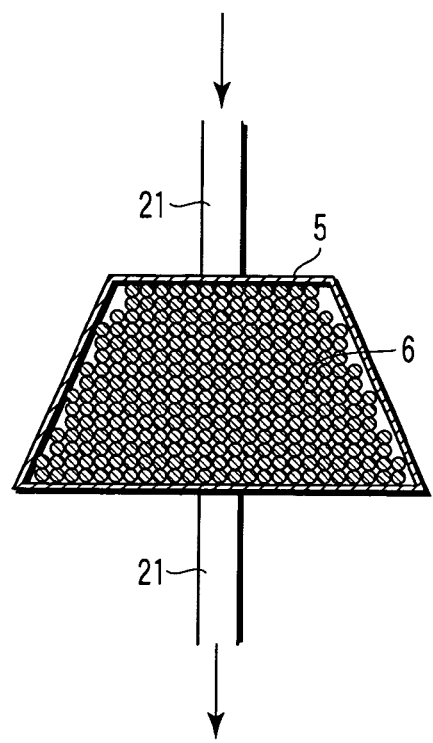
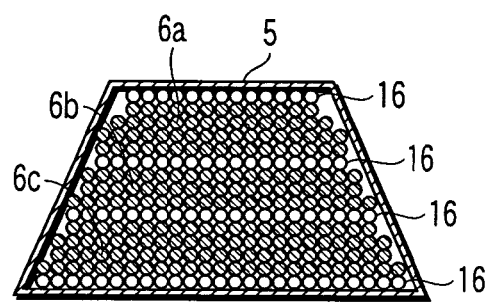
F I G. 5A    F I G. 5B
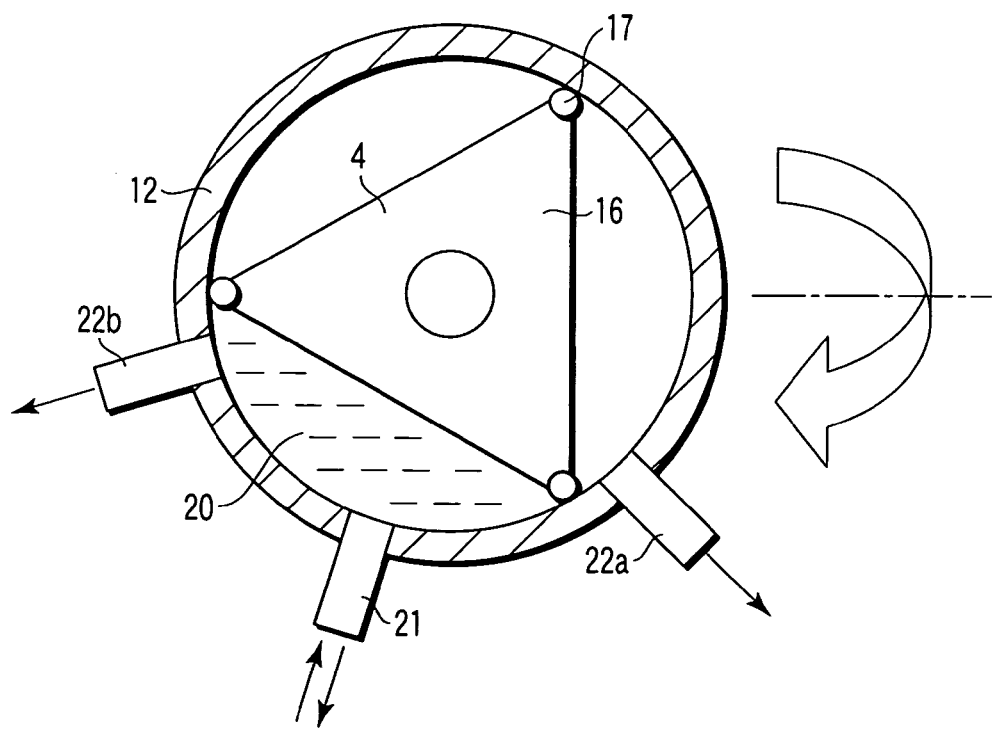
F I G. 6

MAGNETIC REFRIGERATOR

CROSS-REFERENCE TO RELATED APPLICATIONS

This application is based upon and claims the benefit of priority from the prior Japanese Patent Application No. 2005-100309, filed Mar. 31, 2005, the entire contents of which are incorporated herein by reference.

BACKGROUND OF THE INVENTION

1. Field of the Invention

The present invention relates to a magnetic refrigerator using a magnetic material having a magnetocaloric effect.

2. Description of the Related Art

The present refrigeration technique in a room temperature range related closely to human daily life, such as a refrigerator, a freezer and an air conditioner utilizes a vapor compression cycle. However, the refrigeration technique based on the vapor compression cycle has a serious problem of environmental disruption caused by emission of chlorofluorocarbons. Chlorofluorocarbon alternatives seem to have a bad influence on the environment. Under the circumstances, efforts have been taken to protect the environment by using a natural refrigerant (such as $CO_2$ and ammonia) and isobutane with a low risk to the environment. Practical use of safe, clean and efficient refrigeration technique free from environmental disruption due to discharge of working gas has been demanded.

Recently, magnetic refrigeration has been expected as one of eco-friendly and efficient refrigeration technique, and magnetic refrigeration technique in a room temperature range has been actively researched and developed. The magnetic refrigeration technique is principally based on a magnetocaloric effect in iron (Fe) found by Warburg in 1881. The magnetocaloric effect means the phenomenon that varying an external magnetic field applied to a magnetic material in an adiabatic state causes a temperature change of the magnetic material.

Magnetic refrigeration utilizes the magnetocaloric effect to produce a low temperature. In a magnetic material, entropy is changed by the difference in the degree of free electron magnetic spin system between a magnetic-field applied state and a zero magnetic state. Accompanying with such an entropy change, entropy is transferred between the electron magnetic spin system and a lattice system. Magnetic refrigeration uses a magnetic material having a large electron magnetic spin and transfers entropy between an electron magnetic spin and a lattice system by utilizing a high entropy change between a magnetic-field applied state and a zero magnetic state, thereby producing a low temperature.

In the former half of 1900s, magnetic refrigeration systems were developed, in which a paramagnetic salt such as $Cd_2(SO_4)_3 \cdot 8H_2O$ or a paramagnetic compound represented by $Cd_3Ga_5O_{12}$ (gardolinium gallium garnet, GGG) was used as a magnetic material having a magnetocaloric effect. The refrigeration system achieving magnetic refrigeration with the paramagnetic material is mostly applied in a very low temperature range lower than 20K, in which a magnetic field of approximately 10 tesla obtainable using a superconducting magnet is employed.

On the other hand, magnetic refrigeration utilizing magnetic phase transition between a paramagnetic state and a ferromagnetic state of a ferromagnetic material has been actively studied since 1970s to realize magnetic refrigeration in a higher temperature range. As a result of these studies, a number of magnetic materials having a large electron magnetic spin per unit area has been proposed, which includes rare earth elementary substances of lanthanum group such as Pr, Nd, Dy, Er, Tm and Gd, alloy materials such as Gd—Y and Gd—Dy containing two or more types of rare earth elements, and rare earth intermetallic compounds such as $RAl_2$ (wherein R indicates a rare earth element, the same hereinafter), $RNi_2$ and GdPd.

In 1974, Brown (USA) first realized magnetic refrigeration in a room temperature range using a ferromagnetic material Gd with a ferromagnetic phase transition temperature (Tc) of approximately 294K. The Brown's experiment achieved a continuous operation of refrigeration cycle, but did not reach a steady state. In 1982, Barclay (USA) thought up to use positively lattice entropy that was considered an impediment to the magnetic refrigeration in a room temperature range, and proposed a refrigeration system in which a magnetic material bears, in addition to the magnetocaloric effect for the magnetic refrigeration operation, a heat storage effect to store cold energy generated by magnetic refrigeration operation (see U.S. Pat. No. 4,332,135). This magnetic refrigeration system is called an AMR (active magnetic refrigeration) system. These refrigeration systems are operated under a strong magnetic field using a superconducting magnet.

In 1997, Zimm, Gschneidner and Pecharsky (USA) produced experimentally a magnetic refrigerator of the AMR system using a cylinder filled with fine spherical Gd grains, and succeeded in a continuous steady operation of a magnetic refrigeration cycle in a room temperature range. Specifically, they succeeded in refrigeration at about 30° C., by changing a magnetic field from 0 tesla to 5 tesla using a superconducting magnet in a room temperature range, and reported that when a refrigeration temperature difference ($\Delta T$) was 13° C., very high refrigeration efficiency (coefficient of performance COP=15, excluding input power to the magnetic field generator) was obtained. For reference, a refrigeration efficiency of a refrigerator in a vapor compression cycle using a conventional chlorofluorocarbon is 1 to 3.

In 2000, Bohigas (Spain) reported a refrigeration system using a permanent magnet. This refrigeration system has a structure in which a wheel having a magnetic material in a shape of a ribbon placed around the wheel is inserted into a clearance between permanent magnets fixed opposite to each other and the wheel is rotated by a motor. The system uses Gd as the magnetic material, and proves refrigeration of 1.5K in a room temperature environment under the conditions of a magnetic field of 0.3 T, olive oil refrigerant, and rotation speed of 4-50 rpm. However, this magnetic refrigeration system has drawbacks of a complex structure incorporating the rotating member in a refrigerant circulation mechanism and insufficient cooling capacity.

BRIEF SUMMARY OF THE INVENTION

According to an aspect of the present invention, there is provided a magnetic refrigerator which effects refrigeration by circulating a refrigerant between the magnetic refrigerator and an external cooling section and an external heat radiating section, comprising: a housing; a plurality of heat exchangers fixed in the housing and filled with magnetic particles having a magnetocaloric effect; a rotary drive; a rotating shaft arranged in the housing and rotated by the rotary drive; a magnetic field generator fixed to the rotating shaft in the housing which applies a magnetic field to or eliminates a magnetic field from the magnetic particles in the heat exchangers following rotation of the rotating shaft; a refrigerant pump placed in the housing which circulates the refrigerant following rotation of the rotating shaft; a rotary refrigerant control valve placed in the housing which controls supply of the refrigerant to and discharge of the refrigerant from the heat exchangers following rotation of the rotating shaft; and a refrigerant circuit formed by connecting the refrigerant pump, the rotary refrigerant control valve, the heat exchangers, the external cooling section, and the external heat radiating section, wherein the magnetic field generator and the rotary refrigerant control valve are configured to synchronize application of the magnetic field to or elimination of the magnetic field from the magnetic particles with supply of the refrigerant to or discharge of the refrigerant from the heat exchangers.

BRIEF DESCRIPTION OF THE SEVERAL VIEWS OF THE DRAWING

FIGS. 5A and 5B are sectional views showing a heat exchanger of a magnetic refrigerator according to another embodiment of the invention; and FIG. 6 is a plane view showing a rotary refrigerant control valve of a magnetic refrigerator according to another embodiment of the invention.

DETAILED DESCRIPTION OF THE INVENTION

A magnetic refrigerator according to an embodiment of the invention will be explained hereinafter with reference to the accompanying drawings.

Figure 1:
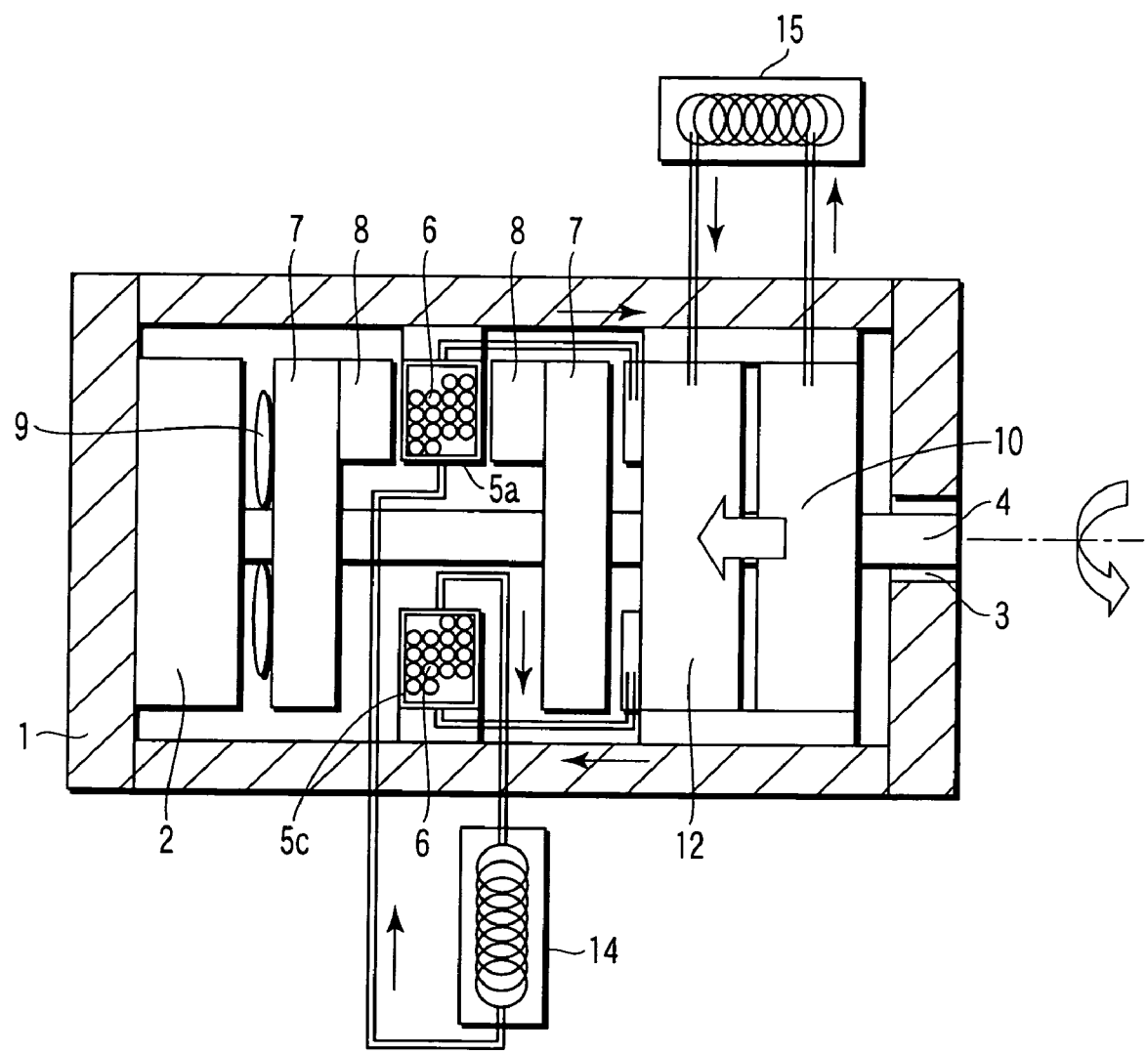
FIG. 1 is a longitudinal sectional view of a magnetic refrigerator according to an embodiment of the present invention.
Figure 2A:
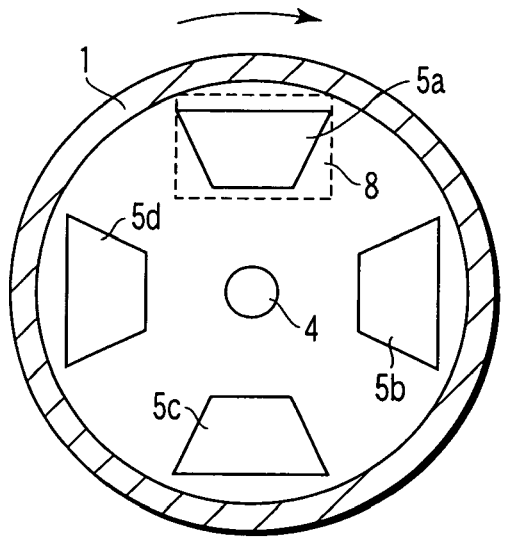
FIGS. 2A, 2B, 2C and 2D are plane views showing the positional relationship between a heat exchanger and a permanent magnet, and plane views showing the positional relationship between a rotor and an inlet and outlet for the refrigerant of a rotary refrigerant control valve, in the magnetic refrigerator according to an embodiment of the invention.
Figure 2B:
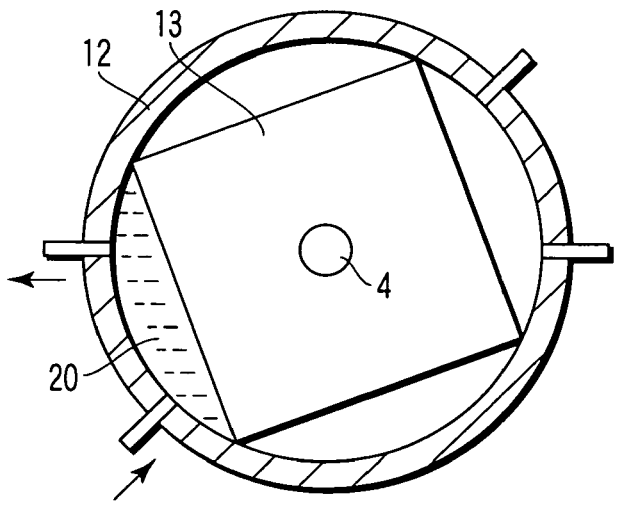
Figure 2C:
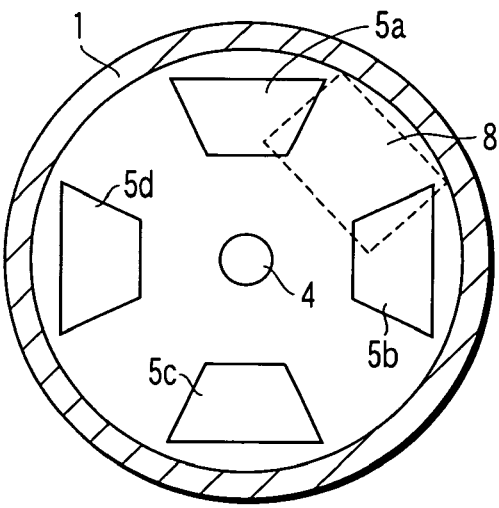
Figure 2D:
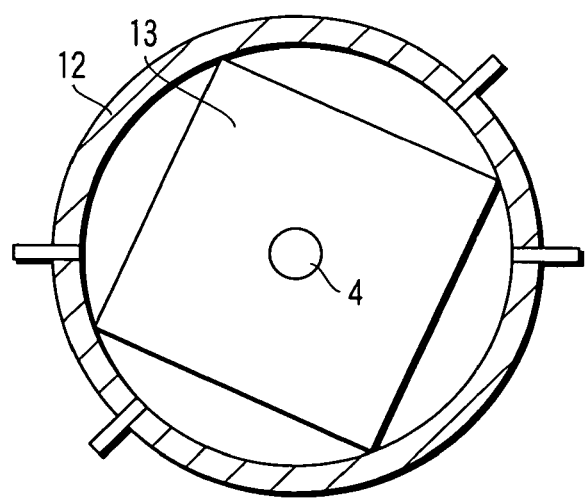
Figure 3:
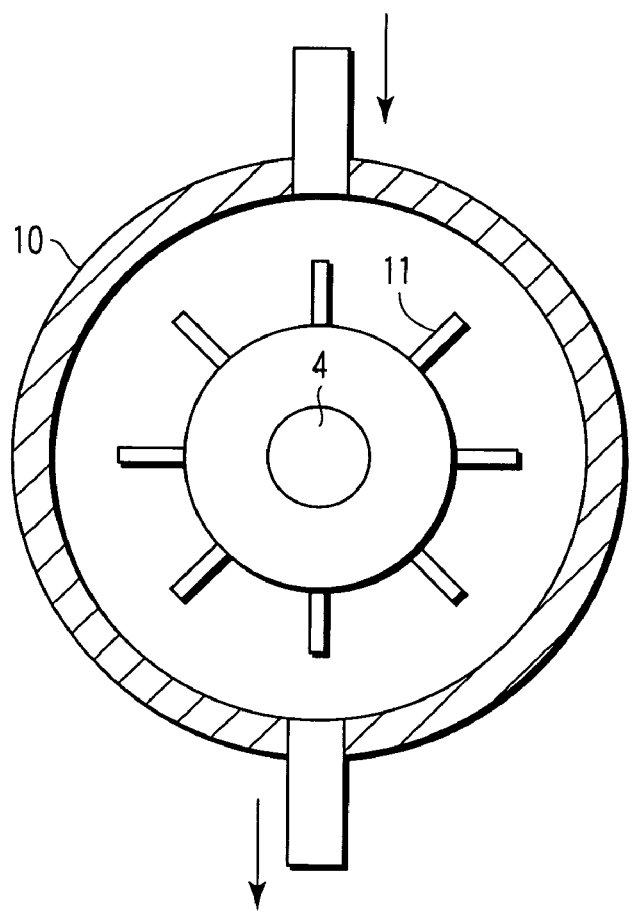
FIG. 3 is a plane view showing the structure of a refrigerant circulation pump of the magnetic refrigerator according to an embodiment of the invention.

FIG. 1 is a longitudinal sectional view of a magnetic refrigerator according to an embodiment of the invention. FIG. 2A is a plane view showing the positional relationship between a heat exchanger and a permanent magnet at a certain angle of rotation. FIG. 2B is a plane view showing the positional relationship between a rotor and an inlet and outlet for the refrigerant of a rotary refrigerant control valve at a certain angle of rotation. FIG. 2C is a plane view showing the positional relationship between a heat exchanger and a permanent magnet at another angle of rotation. FIG. 2D is a plane view showing the positional relationship between a rotor and an inlet and outlet for the refrigerant of a rotary refrigerant control valve at another angle of rotation. FIG. 3 is a plane view showing the structure of a refrigerant circulation pump.

As shown in FIG. 1, this magnetic refrigerator is contained in a cylinder-shaped housing 1. A motor 2 as a rotary drive is installed on one end within the housing 1. As the motor 2, an electric motor or a hydraulic motor is used. A rotating shaft 4 is set rotatably from the motor 2 over a bearing 3 placed at the center of another end of the housing 1.

Heat exchangers 5a, 5b, 5c and 5d are fitted at four positions on the internal circumference at almost the central portion within the housing 1. These heat exchangers 5a, 5b, 5c and 5d are filled with magnetic particles 6 having a magnetocaloric effect.

A pair of magnetic yokes 7 is fixed to the rotating shaft 4 so as to be arranged at the front and rear of the positions the heat exchangers 5a, 5b, 5c and 5d in the housing 1. A pair of permanent magnets 8 as a magnetic field generator is set on the pair of magnetic yokes 7, respectively, so as to sandwich the positions of the heat exchangers 5a, 5b, 5c and 5d with a gap wit each other. As explained later, when rotated, the permanent magnets 8 applies a magnetic field to or eliminates a magnetic field from the magnetic particles 6 in the heat exchangers 5a, 5b, 5c and 5d. The magnetic yokes 7 are used as return paths of a magnetic flux generated from the permanent magnets 8, serving to improve the efficiency of a magnetic circuit. The permanent magnet 8 is not necessarily provided in a pair. One permanent magnet may be set on one magnetic yoke, and the other magnetic yoke may be arranged to face the permanent magnet.

The rotating shaft 4 is also provided with a fan 9 for forced cooling. The fan 9 has an effect of cooling the atmosphere in the housing 1.

The housing 1 contains a refrigerant pump 10 having a liquid-tight casing formed of a container having a leak-proof structure. A blade 11 fixed to the rotating shaft 4 is contained in the pump, as shown in FIG. 3. The refrigerant pump 10 circulates the refrigerant by the rotation of the blade 11. The refrigerant pump 10 functions as a refrigerant tank when the blade 11 is stopped.

The refrigerant pump 10 can be placed outside of the housing 1. In this case, however, another driving source is required to circulate the refrigerant from the refrigerant pump 10. Therefore, the refrigerant pump 10 is preferably placed in the housing 1.

A rotary refrigerant control valve 12 is placed in the housing 1. The refrigerant control valve 12 contains a square rotor 13 fixed to the rotating shaft 4, as shown in FIGS. 2B and 2D. The rotor 13 has sliding parts at respective vertexes of the square rotor 13, which slide in contact with the inner surface of the casing of the rotary refrigerant control valve 12. Supply and discharge of refrigerant are controlled by the rotation of the rotor 13.

A cooling section 14 and a heat radiating section 15 are placed outside of the housing 1 of the magnetic refrigerator. As shown in FIG. 3, the refrigerant pump 10 is connected with a pipe to introduce the refrigerant from the heat radiating section 15, and a pipe to discharge the refrigerant to the rotary refrigerant control valve 12. As shown in FIGS. 2B and 2D, the rotary refrigerant control valve 12 is connected with a pipe to introduce the refrigerant from the rotary refrigerant control valve 12, a pipe to discharge the refrigerant to the heat radiating section 15, a pipe to discharge the refrigerant to a heat exchanger in an endothermic stage, and a pipe to introduce the refrigerant from a heat exchanger in a stage other than the endothermic stage. The length of one side of the rotor 13 of the rotary refrigerant control valve 12 is longer than the distance between the inlet and the outlet on the side of cooling section, and longer than the distance between the inlet and the outlet on the side of the heat radiating section.

The refrigerant 20 is circulated through a refrigeration circuit formed by connecting the refrigerant pump 10, the rotary refrigerant control valve 12, a heat exchanger in the endothermic stage, the cooling section 14, a heat exchanger in a stage other than the endothermic stage, the rotary refrigerant control valve 12, and the heat radiating section 15. The cooling section 14 is placed in a heat-insulating space to obtain a refrigeration space. In the cooling section 14, a low-temperature refrigerant is heat-exchanged with the open air, by which the refrigerant temperature is raised. In the heat radiating section 15, a high-temperature refrigerant is heat-exchanged with the open air through a radiator of a forced cooling fan (not shown), by which the refrigerant temperature is lowered.

The operation principle of the magnetic refrigerator according to the embodiment of the invention will now be described with reference to FIGS. 2A, 2B, 2C, and 2D.

FIG. 2A shows a state that the permanent magnet 8 is moved to an angle of rotation opposite to the heat exchanger 5a following rotation of the rotating shaft 4. At this position, a magnetic field is applied to the magnetic particles 6 in the heat exchanger 5a, by which exothermic change of the magnetic particles 6 is caused. At this time, the refrigerant is discharged to the heat radiating section as indicted by the arrow in FIG. 2B.

FIG. 2C shows a state that the permanent magnet 8 is moved to a position rotated clockwise by 45° from the position in FIG. 2A following rotation of the rotating shaft 4. At this position, a magnetic field is eliminated from the magnetic particles 6 in the heat exchanger 5a. At this time, the discharge of refrigerant to the heat radiating section is stopped, as shown in FIG. 2D.

Then, though not shown in the drawing, the permanent magnet 8 is further moved clockwise by 45° following rotation of the rotating shaft 4. At this position, the refrigerant cooled by endothermic change of the magnetic particles 6 is discharged to the cooling section 14, by which refrigeration is enabled in the cooling section 14.

As explained above, according to the magnetic refrigerator in this embodiment, application of the magnetic field to or elimination of the magnetic field from the magnetic particles 6 by the permanent magnet 8 can be synchronized with supply of the refrigerant to or discharge of the refrigerant from the heat exchangers 5a-5d and discharge of the refrigerant to the heat radiating section or the cooling section in relation to the rotation of the same rotating shaft 4 using one motor 2. This lowers the power consumption of the motor 2, and contributes to improve the refrigeration efficiency (COP) of the magnetic refrigerator in this embodiment. Also, use of only one motor 2 as a drive makes it possible to reduce the size of the magnetic refrigerator itself. Further, efficiently radiating waste heat to the outside of the housing 1 is enabled by attaching the fan 9 on the rotating shaft 4, which makes it advantageous to improve the refrigeration efficiency (COP).

In the prior art, in addition to an actuator for a magnetic field generator, it is necessary to provide separately a solenoid valve to control branching of the refrigerant and a pump to circulate the refrigerant. Thus, power is consumed in two or more instruments. This means an increase in the input energy, which is disadvantageous to the refrigeration efficiency (COP).

Now, other embodiments of the invention will be described.

Figure 4A:
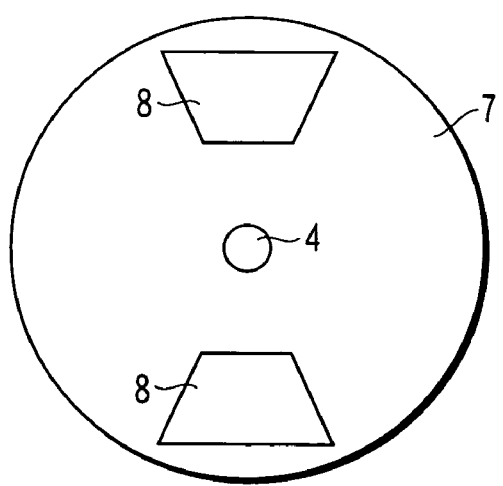
FIGS. 4A and 4B are a plane view showing the forms of a magnetic yoke and a permanent magnet, and a plane view showing the form of a heat exchanger, in a magnetic refrigerator according to another embodiment of the present invention.
Figure 4B:
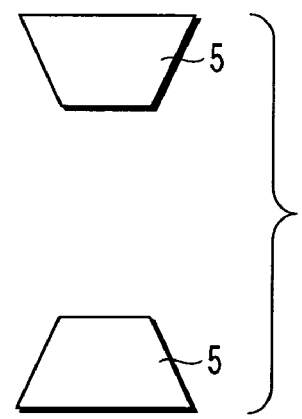

FIG. 4A is a plane view showing the forms of the magnetic yoke 7 and permanent magnet 8. FIG. 4B is a plane view showing the forms of two heat exchangers 5. As shown in FIG. 4A, the magnetic yoke 7 is fixed to the rotating shaft 4, and two permanent magnets 8 are set to the magnetic yoke 7. As in FIG. 1, in the longitudinal section, the heat exchangers 5 are set such that they may be sandwiched with a pair of permanent magnets 8. Therefore, actually, two pairs of permanent magnets 8 are set to a pair of magnetic yokes 7 such that each pair of permanent magnets 8 may sandwich one heat exchanger 5. It should be noted that the number of the heat exchangers 5, magnetic yokes 7 and permanent magnets 8 may be increased.

In this embodiment, the sectional shapes of the heat exchanger 5 and permanent magnet 8 are trapezoidal. The size of the heat exchanger 5 is preferably the same as or smaller than the permanent magnet 8. If the heat exchanger 5 is larger than the permanent magnet 8, the effective use of a magnetic field is disturbed. The trapezoidal section of the heat exchanger 5 increases the filling rate of magnetic particles in the heat exchanger 5. That is, the trapezoidal section of the heat exchanger 5 enables to arrange maximum magnetic particles 6 to the permanent magnet 8, making it possible to achieve further compactness and efficiency.

FIG. 5A shows the cross section of the heat exchanger 5 according to another embodiment. As shown in this drawing, the magnetic particles 6 are filled in the heat exchanger 5 having the trapezoidal cross section. The upper side of the trapezoid is connected with a supply-side refrigerant circulation pipe 21, and the lower side is connected with a discharge-side refrigerant circulation pipe 22. This configuration can lower pressure loss in the circulation of refrigerant.

FIG. 5B shows the cross section of the heat exchanger 5 according to another embodiment. As shown in this drawing, the inside of the heat exchanger 5 is sectioned with meshed partition plates 16 into three areas along the height direction of the trapezoid, where the areas are filled with magnetic particles 6a, 6b and 6c, respectively. For the meshed partition plates 16, a plate with openings smaller than the size of the magnetic particles so as to prevent transfer of the magnetic particles within the heat exchanger 5.

This configuration makes it possible to control the filling rates of the magnetic particles 6 within the heat exchanger 5. By increasing the filling rates or changing the particle sizes in the order of 6a, 6b and 6c, the distribution of pressure loss in the circulation of refrigerant can be optimally controlled. It is possible to use different materials as magnetic particles 6a, 6b and 6c in order to extend the operating temperature range.

FIG. 6 is a plane view showing a rotary refrigerant control valve according to another embodiment. As shown in this drawing, the rotary refrigerant control valve 12 contains a triangular rotor 13 fixed to the rotating shaft 4. The rotor 13 has sliding parts 17 at respective vertexes, which slide in contact with the inner surface of the casing of the rotary refrigerant control valve 12. The casing of the rotary refrigerant control valve 12 is provided with a supply-side refrigerant circulation pipe 21 and discharge-side refrigerant circulation pipe 22a and 22b to circulate the refrigerant 20. In an exothermic stage, the refrigerant 20 is transferred from the supply-side refrigerant circulation pipe 21 to one discharge-side refrigerant circulation pipe 22a. In an endothermic stage, the refrigerant 20 is transferred from the supply-side refrigerant circulation pipe 21 to the other discharge-side refrigerant circulation pipe 22b. The rotor 13 may be rotated in only one direction, or alternately in one direction and in a reverse direction. A magnetic refrigerator with a higher efficiency can be provided by arranging the refrigerant circulation pipe 21, 22a and 22b in an appropriate geometric relationship, and synchronizing application of the magnetic field to or elimination of the magnetic field from the magnetic particles 6 by the permanent magnet 8 with supply or discharge of the refrigerant. Further, a plurality of refrigerant control valves can be operated by providing a plurality of supply-side refrigerant circulation pipes and discharge-side refrigerant circulation pipes.

Next, materials used in the embodiments of the present invention will be described.

The permanent magnet includes a NdFeB magnet, a SmCo magnet and a ferrite magnet.

As a working substance for magnetic refrigeration, a magnetic material having a magnetocaloric effect is used. Examples of such a magnetic material include Gd (gadolinium), a Gd compound containing various elements, intermetallic compounds such as a 2-17 system containing a rare earth element and a transition metallic element, $Ni_2MnGa$ alloy, GdGeSi compounds, $LaFe_{13}$-based compounds, $LaFe_{13}H$, and MinAsSb.

In the magnetic refrigerator according to embodiments of the present invention, magnetic particles are filled in a heat exchanger so as to ensure a space used as a refrigerant path. If the filling rate of magnetic particles in the heat exchanger is too low, the magnetic particles are moved by the flow of refrigerant in heat-exchange with the refrigerant, and thus collision and friction among the magnetic particles would occur. Such a force causes crack or wear in the magnetic particle. Formation of fine powders accompanying with breakage of magnetic particles increases pressure loss of the refrigerant and causes decrease of the refrigeration capacity. Therefore, the filling rate of magnetic particles in a heat exchanger is preferably set to 40 vol % or more and 80 vol % or less in order to avoid such disadvantage. If the filling rate is lower than 40 vol %, the heat exchange efficiency is considerably decreased. If the volume filling rate is higher than 80 vol %, pressure loss is increased in the circulation of refrigerant. Further, the filling rate of magnetic particles is preferably 50 vol % or more and 70 vol % or less.

For realizing a high refrigeration capacity, it is important to perform heat-exchange sufficiently between the refrigerant and magnetic particles filled in the heat exchanger. For this purpose, it is preferable to increase the specific surface area of the magnetic particles. It is effective to reduce the particle size for increasing the specific surface area of the magnetic particles. However, if the particle size is too small, the pressure loss of refrigerant is increased. The conditions such as refrigerant viscosity (surface tension), the performance or pressure loss of the pump and the size of the heat exchanger size have influence on the selection of particle size of the magnetic particles. Therefore, it is preferable to select an optimum particle size of the magnetic particles taking the above conditions in consideration. In the embodiments of the present invention, the size (longer size) of the magnetic particles is preferably 0.1 mm or more and 2 mm or less, and more preferably 0.4 mm or more and 1.5 mm or less. The shape of a magnetic particle is preferably smooth without projections on the surface, for example, sphere or spheroid. The magnetic particles with such a shape can prevent formation of fine powders caused by breakage of the particles, control the increase of pressure loss of refrigerant, and maintain the heat exchange efficiency. Specifically, it is preferable that 80 wt % or more of magnetic particle should have an aspect ratio 2 or less. This is concluded from the following experiments. The experiments were carried out under the conditions that substantially spherical particles were mixed with particles with deformed shapes having an aspect ratio of 2 or more. When the mixing ratio of the deformed particles was more than 20%, fine powders were formed after leaving the mixed particles in the flow of the refrigerant, which increased pressure loss of refrigerant.

From the viewpoint of long-term reliability, the magnetic particles may be provided with a coating layer with a thickness of 10 μm or less. The coating layer is preferably made of materials capable of keeping heat conductivity, mechanical strength and corrosion resistance. Specifically, the coating layer may be made of Au plating, Cu plating, permalloy plating, Al deposited film and Au deposited film. The coating layer made of a resign film is low in cost and excellent in corrosion resistance.

A refrigerant can be selected from a fluorine-based refrigerant, mineral oil, glycerin, an organic solvent, ethylene glycol, water, and a mixture thereof, depending on an operation temperature range of the refrigeration cycle. As the refrigerant, water is most safe, high in specific heat and low in cost, and thus is most suitable. However, in a temperature range of lower than 0° C., a refrigerant made of oil-based refrigerant such as mineral oil and silicone an organic solvent refrigerant such as ethylene glycol and alcohols may be used. A water soluble refrigerant can be used with water at an appropriate mixing rate. The particle size of the magnetic particles is preferably selected at an optimum size in the above range, depending on the viscosity (surface tension) of the refrigerant and the size of the heat exchanger to be used.

In the magnetic refrigerator according to the embodiments of the present invention, the major components necessary for the refrigerating function are contained compact in the housing, making it possible to reduce the size of the refrigeration system. The magnetic refrigerator can be applied to a refrigeration system, such as, a freezer or refrigerator and air conditioner, an industrial freezer or refrigerator, a large-sized freezing or cold-storage warehouse, and a freezer for storage or transport of liquefied gas. The refrigeration capacity and control temperature range are different depending on the places of application, but the refrigeration capacity can be adjusted by the amount of magnetic particles. Further, it is possible to adjust a specific control temperature range by selecting an appropriate property of the magnetic material. The magnetic refrigerator according to the embodiments of the present invention can also be applied to an air conditioning system such as a household air conditioner or an industrial air conditioner utilizing waste heat for heating, and a plant utilizing both cooling and heating.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic refrigerator which effects refrigeration by circulating a refrigerant between the magnetic refrigerator and an external cooling section and an external heat radiating section, comprising:

a housing;

a plurality of heat exchangers fixed in the housing and filled with magnetic particles having a magnetocaloric effect;

a rotary drive;

a rotating shaft arranged in the housing and rotated by the rotary drive;

a magnetic field generator fixed to the rotating shaft in the housing which applies a magnetic field to or eliminates a magnetic field from the magnetic particles in the heat exchangers following rotation of the rotating shaft;

a refrigerant pump placed in the housing and including a blade fixed to the rotating shaft which circulates the refrigerant following rotation of the rotating shaft;

a rotary refrigerant control valve placed in the housing and including a rotor fixed to the rotating shaft which controls supply of the refrigerant to and discharge of the refrigerant from the heat exchangers following rotation of the rotating shaft; and a refrigerant circuit formed by connecting the refrigerant pump, the rotary refrigerant control valve, the heat exchangers, the external cooling section, and the external heat radiating section, wherein the magnetic field generator and the rotary refrigerant control valve are configured to synchronize application of the magnetic field to or elimination of the magnetic field from the magnetic particles with supply of the refrigerant to or discharge of the refrigerant from the heat exchangers.

2. The magnetic refrigerator according to claim 1, wherein the rotary refrigerant control valve comprises a casing, a polygonal rotor fixed to the rotating shaft and provided with sliding parts at vertexes to slide in contact with an inner surface of the casing, and an inlet and an outlet for the refrigerant formed on the casing, and wherein one side of the rotor is set longer than a distance between the inlet and the outlet for the refrigerant.

3. The magnetic refrigerator according to claim 1, wherein the magnetic particles have a size of 0.1 mm or more and 2 mm or less.

4. The magnetic refrigerator according to claim 3, wherein the magnetic particles have a size of 0.4 mm or more and 1.5 mm or less.

5. The magnetic refrigerator according to claim 1, wherein a filling rate of the magnetic particles in at least one of the heat exchanger is set to 40 vol % or more and 80 vol % or less.

6. The magnetic refrigerator according to claim 5, wherein the filling rate of the magnetic particles in the heat exchanger is set to 50 vol % or more and 70 vol % or less.

7. The magnetic refrigerator according to claim 1, wherein at least one of the heat exchangers has a trapezoidal cross section, and wherein the upper side thereof is connected with a supply-side refrigerant circulation pipe, and the lower side thereof is connected with a discharge-side refrigerant circulation pipe.

8. The magnetic refrigerator according to claim 7, wherein the at least one of the heat exchangers is sectioned with a meshed partition plate into a plurality of areas along the height direction of the trapezoid, and wherein the areas are filled with magnetic particles, respectively.

9. The magnetic refrigerator according to claim 8, wherein the filling rate of the magnetic particles in the at least one of the heat exchangers is controlled for the plurality of areas.

10. The magnetic refrigerator according to claim 1, wherein the rotor of the rotary refrigerant control valve is controlled to rotate in one direction, or alternately in one direction and in the reverse direction.

11. The magnetic refrigerator according to claim 1, wherein the magnetic field generator is a permanent magnet.

12. The magnetic refrigerator according to claim 1, wherein the rotating shaft is provided with a fan for forced cooling.

* * * * *